United States Patent [19]

Heaton

[11] 4,359,603
[45] Nov. 16, 1982

[54] CVSD MULTIPLE CONFERENCE SYSTEM
[75] Inventor: Donald L. Heaton, Richardson, Tex.
[73] Assignee: Rockwell International Corporation, El Segundo, Calif.
[21] Appl. No.: 177,655
[22] Filed: Aug. 13, 1980
[51] Int. Cl.³ ............................................. H04M 3/56
[52] U.S. Cl. ..................................... 179/1 CN; 370/62
[58] Field of Search ...................... 179/1 CN, 18 BC; 370/62; 375/27, 28, 29, 30

[56] References Cited

U.S. PATENT DOCUMENTS

| Re. 29,991 | 5/1979 | Wolcott | 370/62 |
| 3,970,797 | 7/1976 | Johnson et al. | 370/62 |
| 4,163,871 | 8/1979 | Maggi | 179/1 CN |
| 4,215,247 | 7/1980 | Lambert | 179/18 BC |
| 4,271,502 | 6/1981 | Goutmann et al. | 370/62 |

OTHER PUBLICATIONS

N. C. Seiler, "A Monolithic Implementation of a CVSD Algorithm", 1976 International Computer Conference on Communications, vol. II, pp. 31-11 through 31-16.
"Preliminary HR-3210 All-Digital Continuously Variable Slope Delta Modulator (CVSD)", Harris Corporation Bulletin, 1976.

*Primary Examiner*—Joseph A. Popek
*Attorney, Agent, or Firm*—Michael E. Taken; V. Lawrence Sewell; Howard R. Greenberg

[57] ABSTRACT

A plurality of conferencers are connected to a common bus. Each conferencer has a plurality of accumulators each for outputting a CVSD conference. Each conferencer selectively places any one or all or any combination of a plurality of inputs in any one or all or any combination of its accumulators independently of each other and independently of the accumulators in the remaining conferencers. Inputs may be selectively scaled to provide different volume levels for different conferees.

23 Claims, 9 Drawing Figures

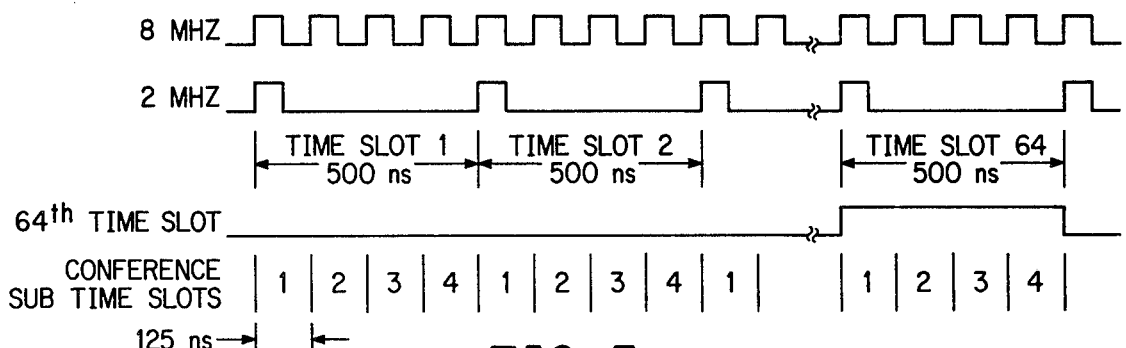
FIG. 5
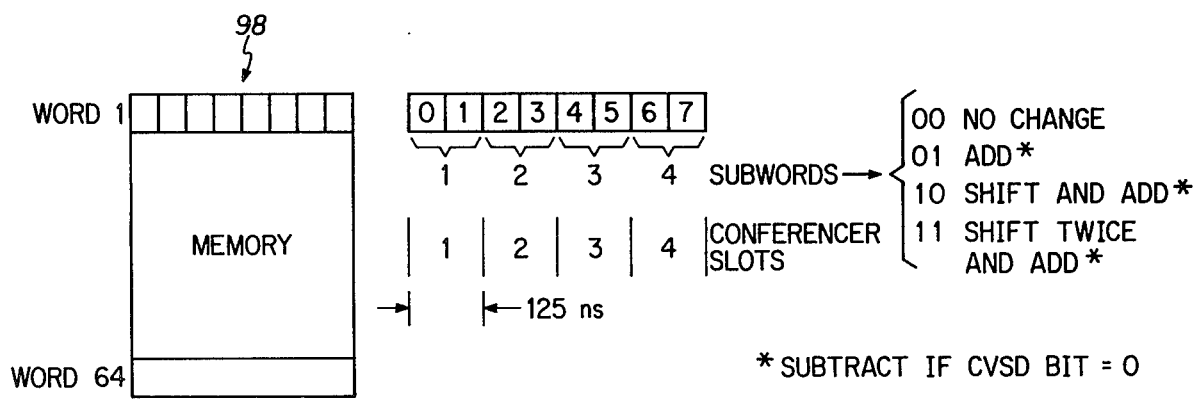
FIG. 6
| CVSD BIT | 12th ACC BIT | 11th ACC BIT | ALU FUNCTION |
|---|---|---|---|
| 0 | 0 | 0 | ⎫ |
| 0 | 0 | 1 | ⎬ A − B PERMITTED |
| 0 | 1 | 1 | ⎭ |
| 0 | 1 | 0 | A − B INHIBITED |
| 1 | 0 | 0 | ⎫ |
| 1 | 1 | 1 | ⎬ A + B PERMITTED |
| 1 | 1 | 0 | ⎭ |
| 1 | 0 | 1 | A + B INHIBITED |
FIG. 7

4,359,603
CVSD MULTIPLE CONFERENCE SYSTEM

The Government has rights in this invention pursuant to Contract No. N00024-78C-2339 awarded by the Department of the Navy.

TECHNICAL FIELD

The invention relates to equipment for connecting more than two voice channels together in a call, generally known as conferencing, and more particularly to an arrangement for generating a number of independent CVSD (continuously variable slope delta) conferenced outputs from a number of CVSD inputs.

BACKGROUND

Conferencing is well-known in the voice communication art. The simplest type of conference call is the one in which a third person joins an existing conversation. The greater the number of conferees or participants in a conference call, the more complex the circuitry. Circuits are known which accommodate the needs of hundreds of participants in a conference call.

In the ideal conferencing arrangement, any conferee can speak at any time, and any number of conferees can speak simultaneously with each being able to hear the combined voices of the others. In analog conference circuits, input signals from all conferees are summed to yield an output signal which is a composite of all the input signals.

In digital conference circuits, the summing of input signals from conferees will produce intelligible speech only if the digital code is linear, for example LPCM (linear pulse code modulated) or DPCM (delta pulse code modulated). Linear format digital signals can be summed because each bit has the same weight, i.e. represents the same stepsize or magnitude.

Some digital communications systems use a nonlinear compressed digital code format known as CVSD (continuously variable slope delta). One reason CVSD format is chosen over PCM format in certain applications is that CVSD allows a lower data rate since it is compressed, and consequently more channels may be multiplexed together at the same bit rate. For example, the PCM used in standard U.S. telephone systems typically requires a sample rate of 8,000 samples per second and 8 bits per sample, which equals 64 K bits per second per channel. Using CVSD, equal or better transmission quality is obtained at 32 K bits per second, and thus twice as many channels could be multiplexed on the same transmission medium.

A drawback of CVSD, however, is that direct summing of CVSD digital bit streams will not produce intelligible speech since the digital signals are based on a nonlinear compression conversion. During compression, different bits are assigned different weight and hence the bit positions are nonlinear. This nonlinearity enables compression but prevents straightforward summing of signals.

One system providing CVSD conferencing is disclosed in allowed U.S. patent application Ser. No. 960,491, "Digital Conferencing Apparatus" filed Nov. 13, 1978 by Donald L. Lambert, and assigned to the assignee of the present invention, now U.S. Pat. No. 4,215,247. Each of the conferees' CVSD signals are converted to linear signals by expansion from CVSD to DPCM representing the differentials of the voice signals. This expansion is the reverse of the above-mentioned nonlinear compression. Each of the expanded linear signals is summed and added to an element of the conference sequence which was previously stored in memory. This gives a linear digital signal indicative of the composite voice signal. The linear signal is then compressed to provide a CVSD digital sequence for transmission to the conferees.

SUMMARY OF THE INVENTION

The present invention provides a system which generates multiple, independent CVSD conference output signals, each being formed from any combination of a plurality of CVSD input signals. One particularly desirable characteristic of the system is its flexibility in that it allows any one or all or any combination of inputs to be placed in any one or all or any combination of conference accumulators, each of which outputs a conference.

Each of a plurality of CVSD input signals is expanded to a linear format input and placed on a data bus. Conferencing circuitry is connected to the bus and includes a plurality of conference accumulators each for outputting a conference. Selection circuitry selectively places any input from the bus in any one or all or any combination of the accumulators.

In one form of the invention, the inputs are placed on the bus in sequential time division multiplexed order. The selection circuitry includes an arithmetic logic unit at the input to the accumulators which sums the presently appearing signal on the bus with the current contents of an accumulator or leaves such contents unchanged. The selection circuitry includes a memory having at least one storage location for each input conferee for each accumulator for storing the function to be performed on each conferee signal by the arithmetic logic unit for each of the accumulators. The original CVSD bit chooses additive or subtractive summing in the arithmetic logic unit when the memory chooses summation. Each input is placed in any one or all or any combination of the conferenced accumulators independently of the other inputs. Each accumulator outputs a conference whose accumulated contents is independent of the other conferenced outputs.

In preferred form, the conferencing circuitry comprises a plurality of conferencers, each having a memory, arithmetic logic unit and a plurality of accumulators associated therewith. The input signals on the bus are available during a given time slot in accordance with a predetermined data rate. The original CVSD bit is transmitted as a sign bit to the arithmetic logic unit for indicating addition or subtraction when the memory chooses summation. The memory in each of the conferencers is clocked from location to location at the same rate in synchronism with the input signals on the bus. The plurality of accumulators in each conferencer are clocked at a faster rate, with each accumulator assigned a sub-time slot during which the arithmetic logic unit for that conferencer can access the contents of such accumulator. During one time slot of the bus, the arithmetic logic unit sequentially accesses all of the accumulators in its conferencer during respective sub-time slots. Also during this one time slot of the bus, one storage location or word is available from the memory for that conferencer. This word has a plurality of sub-words, one for each accumulator and its associated sub-time slot. The sub-words are multiplexed at the higher rate in synchronism with clocking between accumulators such that each sub-word comprises a control code for the arithmetic logic unit for a given accumulator in that conferencer during a given time slot of the input signal.

In another aspect, the invention enables the relative volume between inputs of a conference to be changed by scaling the input signal before summing it in an accumulator. This is beneficial where, for example, one of the conferees is a radio operator and wishes to also monitor radio reception in the conference call but as background at a reduced volume.

Other aspects and advantages will become apparent hereafter.

BRIEF DESCRIPTION OF THE DRAWINGS

FIG. 5 is a timing diagram illustrating operation of the circuitry of FIG. 4.

FIG. 6 illustrates the configuration of the control memory of FIG. 4.

FIG. 7 is a table showing the bit combinations used for overload prevention in FIG. 4.

DETAILED DESCRIPTION

Figure 1:
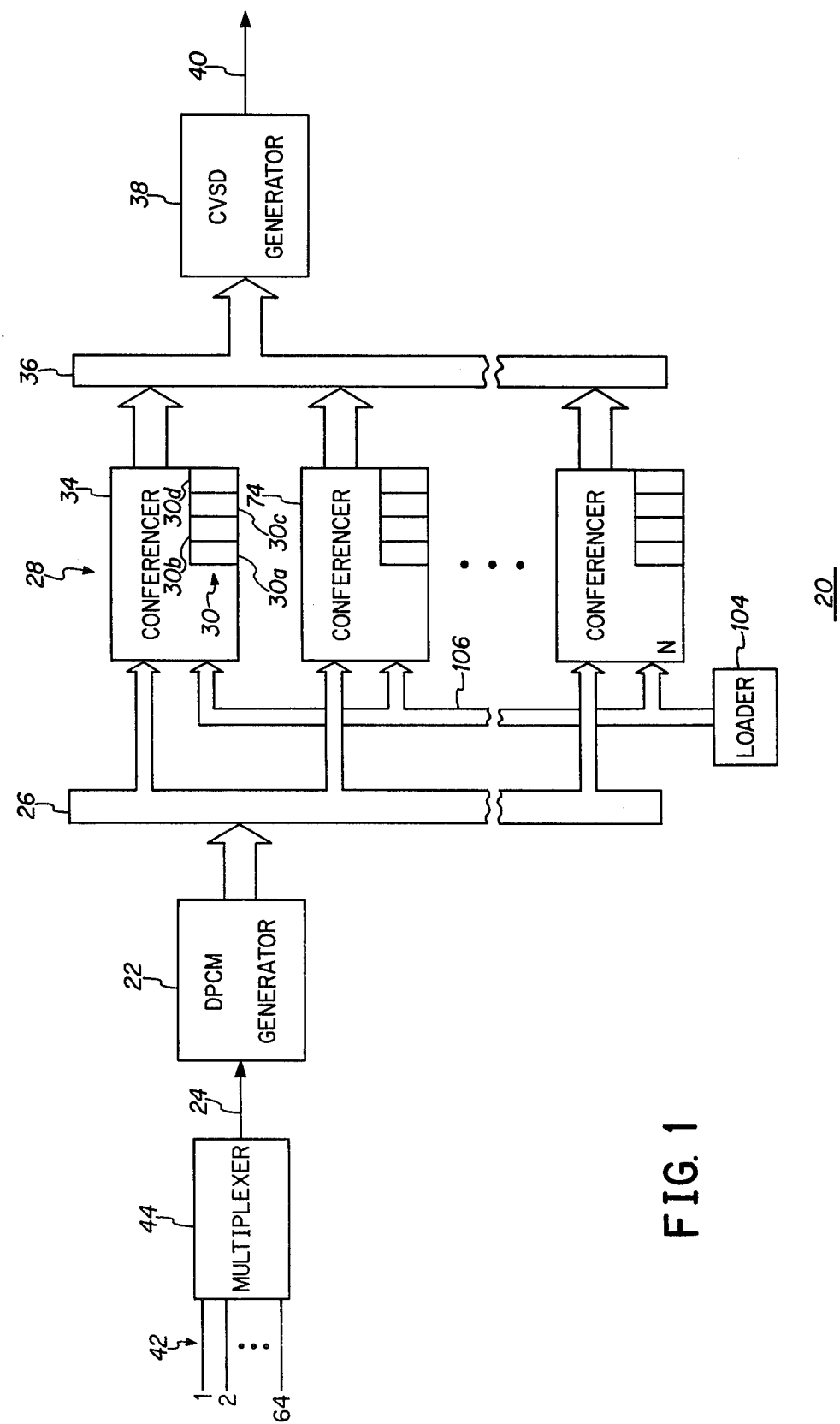
FIG. 1 is a schematic circuit diagram of a conference system constructed in accordance with the invention.

There is shown in FIG. 1 a CVSD multiple conference system generally designated by the reference character 20. An overview will be given first. The system includes means 22 for expanding a plurality of CVSD input data signals on input line 24 to a linear format on data bus 26. Conferencing circuitry 28 is connected to the bus and includes one or more conferencers N. Each conferencer has a plurality of accumulators, such as accumulators 30 in the first conferencer 34. Each accumulator accumulates or sums any of the various input signals on bus 26 and outputs a single composite conference thereof. Conferencer 34 thus outputs a plurality of conferences to a bus 36, one conference for each of the accumulators 30. The remainder of the N conferencers likewise each output a plurality of conferences to bus 36. The conference signals on bus 36 are compressed back to CVSD format by a CVSD generator 38 and output on line 40.

In FIG. 1, the participant CVSD inputs 42 are multiplexed by a multiplexer 44 for delivery in time division multiplexed sequential order to DPCM generator 22 which generates a differential PCM value for each CVSD input bit. In one implementation of the system, there are 64 input channels to multiplexer 44, each having a CVSD bit period of 32 microseconds. The DPCM generator is clocked at a 2 MHz rate and processes a CVSD bit and outputs a differential code every 500 nanoseconds. A five bit value code plus the original CVSD bit indicating whether to add or subtract the difference is placed on bus 26 and lasts 500 nanoseconds. One variation is to generate a negative number (in two's complement form) when the CVSD bit equals zero and place a positive or negative number on the bus which would always be added at the conference accumulator, and thus afford means responsive to the original CVSD bits as sign bits for providing additive or subtractive summing in the accumulator.

Figure 2:
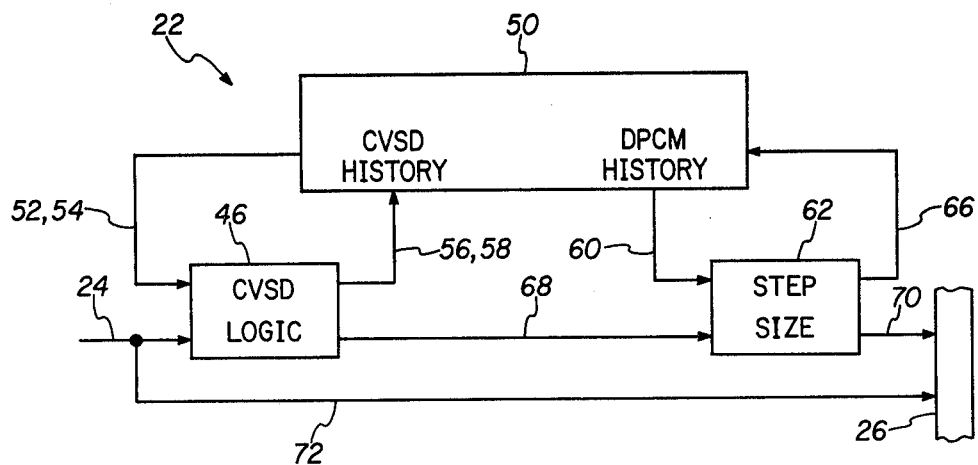
FIG. 2 is a schematic block diagram of the DPCM generator of FIG. 1.
Figure 3:
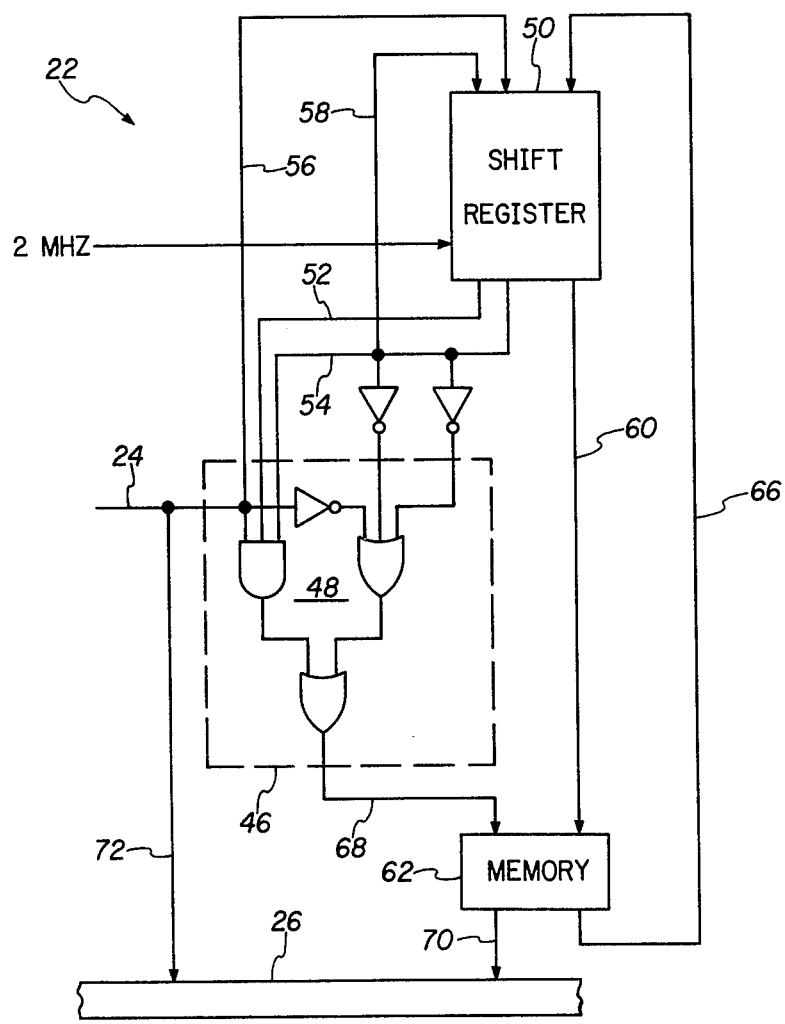
FIG. 3 is a circuit diagram of the generator of FIG. 2.

Referring to FIG. 2, DPCM generator 22 includes CVSD logic 46 which comprises run-of-three detection circuitry shown by gates 48, FIG. 3. These gates together with a shift register or equivalent memory 50 detect three consecutive zeros or three consecutive ones by gating the current CVSD bit on input 24 with the previous two bits. Memory 50 is a 14 bit wide×N bit deep shift register with the two most recent bits being output on lines 52 and 54. The current and previous bit are returned to the shift register 50 on lines 56 and 58. The remaining 12 bits of register 50 are output on line 60 to another memory 62 which determines the stepsize, i.e. the magnitude or numerical value of the DPCM generated code for the weighted CVSD bit. A 8,912 word by 17 bit ROM is used for memory 62. 12 of the bits are fed back via line 66 to shift register 50 such that the latter tracks DPCM history and enables the appropriate stepsize. An output from CVSD logic circuit 46 is generated in response to a run-of-three detection and fed via line 68 to memory 62 to gate a five bit output therefrom on line 70 to bus 26. The five bit code on bus 26 is a linear multi-level digital code capable of 32 different numerical values representing the size or weight of the CVSD input bit. The original CVSD input bit is placed via line 72 on bus 26 to indicate whether the value is increasing or decreasing and thus whether the five bit value from line 70 is to be added to or subtracted from the current speech level. The outputs on lines 70 and 72 last 500 nanoseconds. The six bits on these lines 70 and 72 may be latched before entering the bus 26 to give the longest possible time on the bus.

Figure 8:
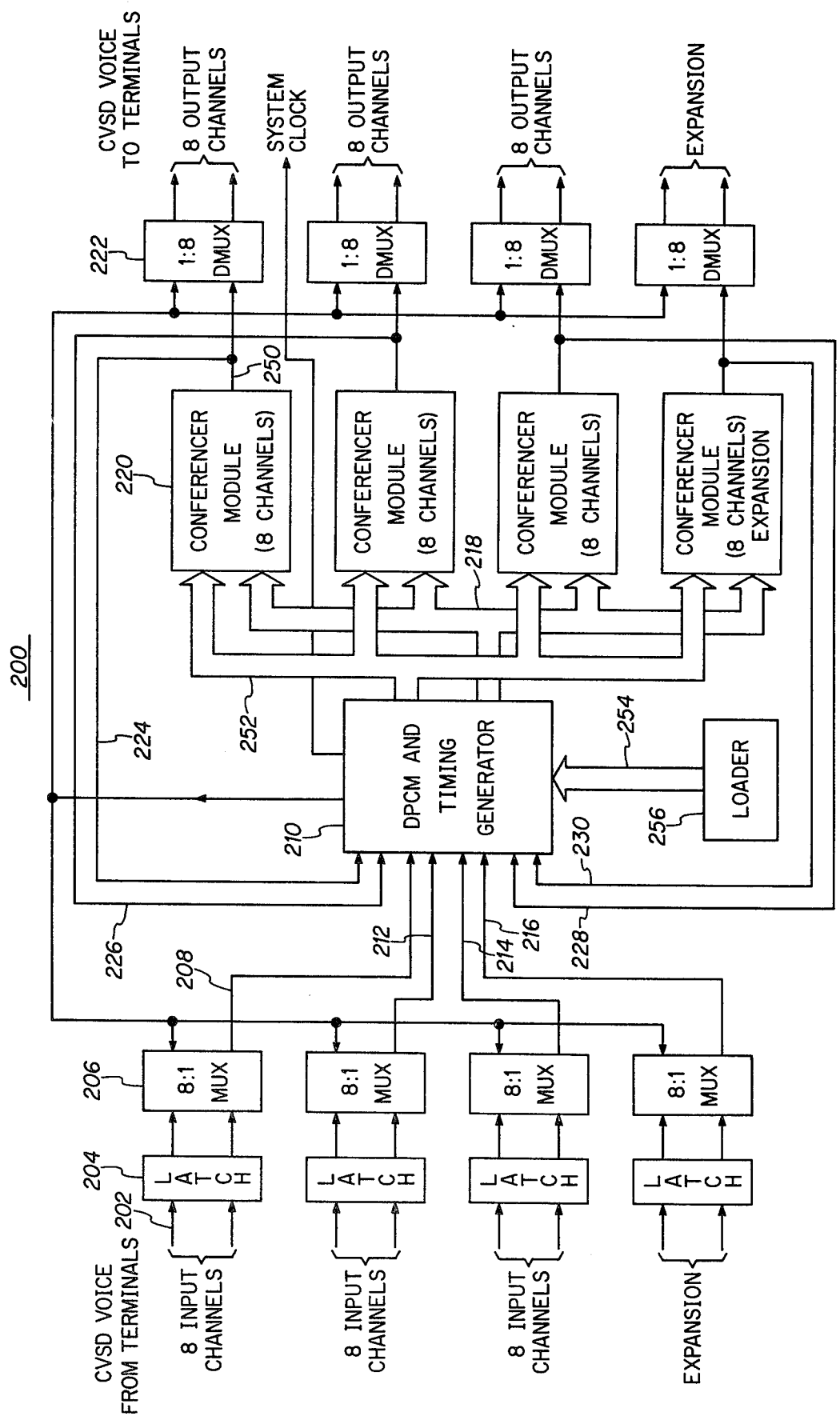
FIG. 8 is another embodiment of a conference system constructed in accordance with the invention.

For further reference regarding encoding and decoding CVSD, i.e. generating DPCM from CVSD and the reverse, reference is made to: Harris Corporation Bulletin HR-3210 "All Digital Continuously Variable Slope Delta Modulator (CVSD)", 1976; an article entitled "A Monolithic Implementation of a CVSD Algorithm" by N. C. Feiler, R. Flowers, and J. Friedman, 1976 International Computer Conference on Communications, Volume II, pages 31-11 through 31-16; and the aforenoted Lambert Application. ROM 62 provides the syllabic filtering performed in some of the above noted references by a combination of plural registers and adders. As an alternative to the compression circuitry of CVSD generator 38, the means for generating CVSD outputs may comprise a feedback loop from the outputs of the accumulators to inputs of DPCM generator 22, as shown in FIG. 8 by return line 224 to generator 210, described hereinafter, and disclosed and claimed in my copending application Ser. No. 069,961 filed Aug. 27, 1979, for "System and Method For Generating a CVSD Conference Using Error Accumulation".

Referring generally again to FIG. 1, the input signals on bus 26 are sequenced in time division multiplexed order with each six bit signal lasting for one time slot of 500 nanaseconds, FIG. 5. Conferencer 34 includes four accumulators clocked one to the other at an 8 MHz rate such that each has a 125 nanosecond sub-time slot. Each of the remaining N conferencers has four accumulators similarly clocked to provide four conferencer sub-time slots of 125 nanoseconds each during each data time slot of 500 nanoseconds. During each 500 nanosecond time slot on bus 26, a six bit signal is present, one bit being the original CVSD bit and the other five representing the weight or size of that bit. The five bit signal value may be placed in the first accumulator 30a in conferencer 34 during the first 125 nanosecond conferencer sub-time slot. This five bit signal value may be placed in the second accumulator 30b of conferencer 34 during the second 125 nanosecond sub-time slot, and so on for the third and fourth accumulators 30c and 30d during the third and fourth 125 nanosecond sub-time slots. The five bit signal value may likewise, during the same 500 nanosecond time slot of bus 26, be put in any one or all or any combination of the accumulators of the second conferencer 74, and likewise for each of the remaining N conferencers. The sixth bit of the signal on bus 26 is the original CVSD bit and is also delivered to each of the N conferencers.

Each conferencer includes a memory for controlling whether the signals on bus 26 are added to the accumulators in that conferencer. The memory specifies which of the four conference accumulators receives the signal currently appearing on bus 26. In one configuration, for a 64 channel input system, a 64 word by 8 bit memory is provided which is clocked from word to word at a 2 MHz rate such that each word corresponds to one 500 nanosecond time slot of data on bus 26. Each 8 bit word is divided into four sub-words, to two bits each, multiplexed at the 8 MHz rate to provide four sequential control codes each lasting 125 nanoseconds for controlling one accumulator during a respective one of the conferencer sub-time slots. This control code determines whether the signal on bus 26 will be placed in the correspondent accumulator of that conferencer.

A more detailed description of conferencer 34 will now be given in conjunction with FIGS. 4 and 5. Each of the N conferencers are identical. System timing is provided by an 8 MHz clock 76 and a counter 78 for reduction to 2 MHz where needed. Synchronization with incoming data may be afforded by any of numerous well known techniques, such as clock extraction from the data for gating the timing signals via sync line 80. The disclosed conferencer is implemented for four conference processing. More conferences can be processed in the same manner by increasing the speed of the 8 MHz clock, adding more memory and using sufficiently fast logic.

Figure 4:
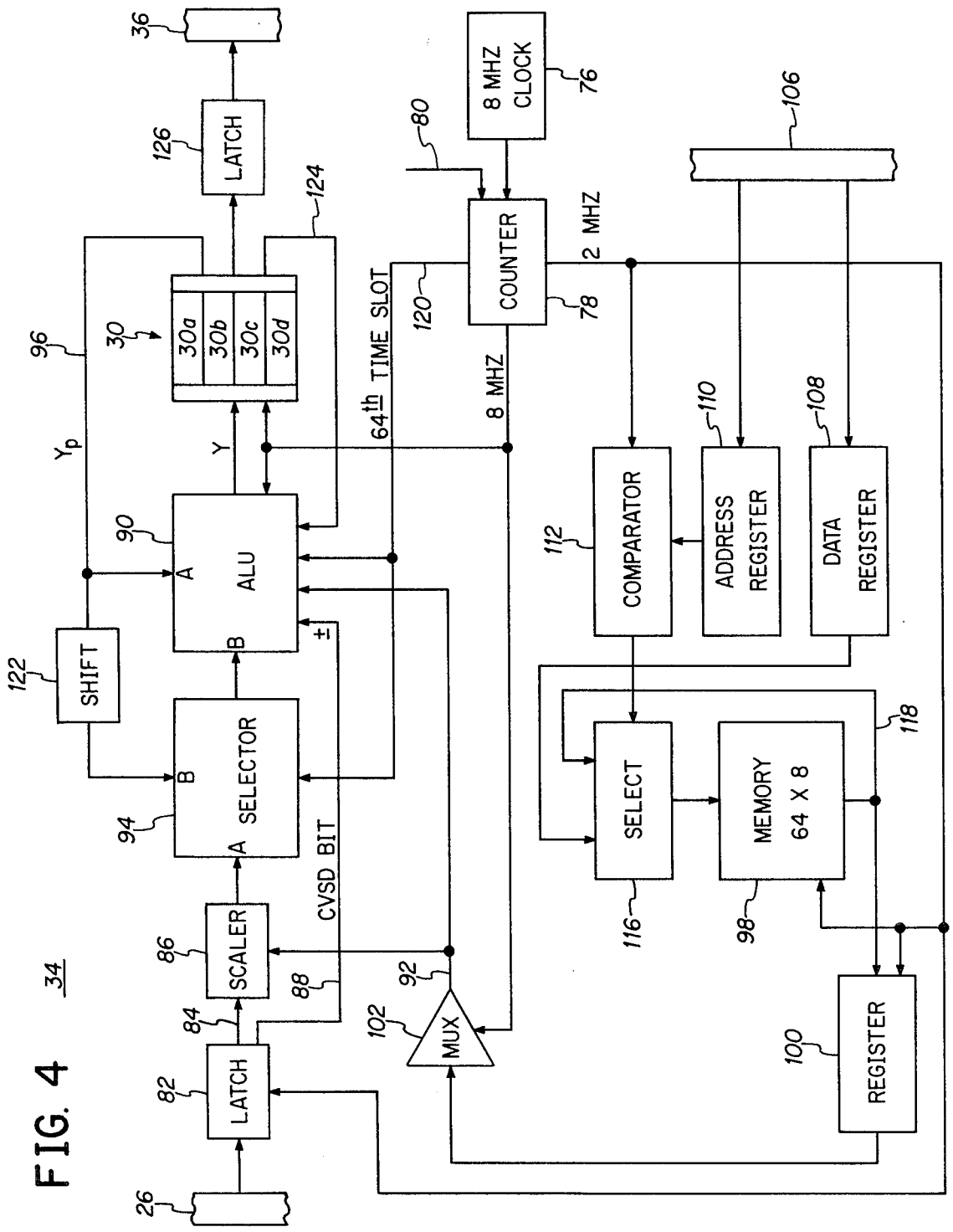
FIG. 4 is a detailed circuit diagram of the conferencing circuitry of FIG. 1.

In FIG. 4, the signal on bus 26 is latched into conferencer latch 82 every 500 nanoseconds in accordance with synchronized 2 MHz clocking coinciding with the 500 nanosecond time slots on the bus. The latch serves as a buffer from the bus and eliminates bus propagation delays from affecting the processing in conferencer 34. The five bit value portion of the signal respresenting the size or weight of the CVSD bit is output from latch 82 on line 84 to a scaler 86. The remaining sixth bit, which is the original CVSD bit, is output from latch 82 on line 88 to an arithmetic logic unit (ALU) 90.

Scaler 86 shifts the input signal for multiplication purposes as controlled by a two bit code on line 92. A shift of one amounts to a multiplication by two and will result in a 6 decibel increase in the level of the associated conferee in the conference output. A shift of two amounts to a multiplication by four and will result in a 12 decibel increase in the level of the associated conferee in the conferenced output. Scaler 86 outputs a seven bit code. When there is no shifting performed, the signal value resides in the five least significant digits, with the two most significant digits being zero. If the signal is shifted once, the least significant digit becomes zero and the next five digits contain the signal value. If the signal is shifted twice, the two least significant digits become zero and the remaining five digits contain the signal value.

Scaler 86 delivers its output to the A input of a selector 94. Selector 94 selects either word A or word B, and delivers an eight bit word to the B input of ALU 90. During time slots 1 through 63, FIG. 5, the selector chooses its A input and delivers the seven bit output of the scaler plus a padded zero in the most significant digit to the B input of ALU 90.

The conference accumulators 30 of FIG. 1 are implemented by a four word by twelve bit shift register memory providing four accumulators 30a, 30b, 30c and 30d. The output of each accumulator is fed back on line 96 to the A input of ALU 90. The accumulators are clocked at an 8 MHz rate, FIG. 5, and each of the four accumulators is processed for a 125 nanosecond sub-time slot during the 500 nanosecond time slot of the signal on bus 26. ALU 90 receives the contents of the accumulator being processed on its A input and either: (a) adds or subtracts the B input to from A plus B or A minus B; or (b) allows A to pass unaltered to the Y output. The output of ALU 90 is delivered as a signal Y and placed back in the accumulator being processed.

Control lines 88 and 92 determine the function to be performed by ALU 90. Line 92 determines whether A is to be combined with B, and if so, line 88 determines whether B is to be added to or subtracted from A. Line 88 carries the original CVSD bit as a sign bit and indicates increasing or decreasing values.

A control memory 98 is provided by a 64 word by 8 bit shift register memory, or RAM operated in sequential order, that is shifted, or read, each 500 nanoseconds in synchronism with the time slots on bus 26. Each 8 bit word is divided into four sub-words of two bits each. These two bit sub-words define a control code which determines the deposition of the current time slot signal from bus 26 to an associated conference accumulator 30a–d.

FIG. 6 shows the organization of the control memory into 64 words each having an 8 bit length. The first word, for example, is shown divided into its four sub-words of two bits each. These four sub-words correspond respectively to the four conference accumulators 30a–d. For example, the first 8 bit word of memory 98 is accessed synchronously with the first signal appearing on bus 26 and lasts 500 nanoseconds concurrently therewith. During the first 125 nanoseconds of this 500 nanosecond time slot, the first two bit sub-word is accessed concurrently with conference accumulator 30a and determines the desposition of the signal on bus 26 relative thereto. During the second 125 nanosecond sub-time slot, the second two bit sub-word is accessed concurrently with accumulator 30b and determines desposition of the signal from bus 26 relative thereto, and so on for the third and fourth sub-words during the third and fourth 125 nanosecond sub-time slots for the third and fourth accumulators 30c and 30d. This sequence is repeated for the 2nd through 63rd signals appearing on bus 26 during the 2nd through 63rd 500 nanosecond time slots. The 64th time slot is used for accumulator decay, described hereinafter. One cycle lasts 32 microseconds (64×500 nanoseconds), and thus each participant is sampled every 32 microseconds.

FIG. 6 further shows the control code defined by the two bit sub-words. A 00 leaves the accumulated contents of the associated conference accumulator unchanged by commanding ALU 90 to pass its A input back to the accumulator unaltered. A 01 commands ALU 90 to combine its A and B inputs such that the signal on bus 26 is combined with the B input and placed back in the associated accumulator. If the CVSD bit on line 88 is 1, then the ALU performs A+B; if the CVSD bit on line 88 is 0, then the ALU performs A−B and delivers the result Y back to the associated conference accumulator. A sub-word control code of 10 designates a shift of the signal in scaler 86 and the addition or subtraction thereof by ALU 90 as determined by the CVSD bit sign. A sub-word control code of 11 designates a shift by two in scaler 86 and the addition or subtraction thereof in ALU 90 as determined by the CVSD sign bit.

Referring to FIG. 4, memory 98 is output through a register 100 which acts as a buffer to isolate the control member propagation delays from the speed requirements of the rest of the circuit. As aforenoted, the memory is clocked from word to word at a 2 MHz rate such that each word is available during a 500 nanosecond time slot coincident with the data signal time slots on bus 26. Each 8 bit control memory output word is divided into the four two bit sub-words by a multiplexer 102 which is clocked at an 8 MHz rate to match the sequential processing of the four conference accumulators 30a–30d during each 500 nanosecond time slot such that 125 nanoseconds is allotted to each sub-word and its associated accumulator. The output of the multiplexer is fed on line 92 to ALU 90 for delivery of the summation control code thereto. The output of multiplexer 102 is also delivered on line 92 to scaler 86 for shift control.

Memory 98 is loaded by a loader 104, FIG. 1, such as a microprocessor or the like. A bus 106 carries the address and data information to be written into control memory 98. Data register 108, FIG. 4, is loaded with the data to be written into the memory, and address register 110 is loaded with the address to be modified. When comparator 112 detects that the current address from counter 78 is equal to the address to be modified, it outputs a coincidence signal to which selector 116 responds by gating the new 8 bit data word from the data register 108 into memory 98 instead of the recirculated memory output 118.

As previously noted, selector 94 selects input word A during the first 63 time slots. During the 64th time slot, the selector is switched to select input B. Control line 120 from counter 78 to selector 94 goes high during the 64th time slot, FIG. 5, to cause selector 94 to choose B. In this configuration, the 64th time slot is therefor unusable for an input conferee. The B input of selector 94 is the output of the conference accumulator shifted K places toward the least significant digit. Return line 96 feeds the accumulator contents through a shift register 122 to the B input of selector 94.

Control line 120 is also connected to ALU 90, and during the 64th time slot ALU 90 is set to subtract its B input from its A input, i.e. perform the function A−B. The new value Y loaded back into the accumulators is thus $Y=(Yp)-(2^{-K})(Yp)$, where Yp is the immediately preceeding value of Y. For the present system, K=5 has been found to be a good selection, with a time constant of 0.98 milliseconds. The purpose of this operation is to create a leaky accumulator, i.e., an integrator, with the result that past history is allowed to decay out. This reduces the possibility of building up a DC value in the accumulator over a long period of time, and eliminates the need to zero the accumulator when changing conferences.

With K=5, shift register 122 shifts the output of the accumulator five digits towards the least significant bit thus reducing that number to 1/32 of its value before the shift in register 122. This 1/32 of the value is thus fed by selector 94 to the B input of ALU 90 and subtracted therein from the original numerical value thus yielding a number which is 31/32 of that original numerical value. It is thus seen that during each cycle of 64 time slots, the value in the accumulators is reduced by 1/32, i.e. during the next 64th time slot the numerical value is reduced by a further 1/32 and so on. The signal on line 120 remains high during the entire 500 nanoseconds of each 64th time slot such that the above noted operations are performed for all four 125 nanosecond conference sub-time slots such that the decay function is performed during this time for all conference accumulators.

During time slots 1 through 63, the decay signal on line 120 is low and ALU 90 is controlled during each 125 nanosecond sub-time slot by the selected two bit code on line 92 from control memory 98. As previously noted, if this code is 00 then ALU 90 passes its A input back into the associated conference accumulator without alteration. If the code is any value other than 00, the ALU operation is further conditioned on the CVSD bit line 88 and on the overload indication bits in the two most significant digits 11 and 12 of each of the accumulators 30a–30d, where, as aforenoted, conference accumulators 30 are formed by a four word by twelve bit shift register memory. The two most significant bits 11 and 12 are fed back on return line 124 to ALU 90. The various bit combinations are shown in FIG. 7, including those indicating a near overload condition and inhibiting an ALU function which would otherwise cause overflow of an accumulator, i.e. addition or subtraction to a numerical value beyond the capacity of the accumulator. This overload prevention is desirable to avoid irritating or painful screeches or sudden variations in the volume level of speech patterns which might otherwise occur, for example, when an accumulator underflows or overflows and instantaneously reverts to a much higher or lower value.

For the first combination 000, FIG. 7, ALU 90 performs the function A−B and delivers the result Y back to the accumulator. For the second combination 001 of the CVSD bit and the 12th and 11th accumulator bits, respectively, the accumulated numerical value is a large positive number and thus the subtraction of B from A will not cause an overload and is thus permitted. In the third combination 011, there is a small negative accumulated numerical value and thus subtraction is permitted. In the fourth combination 010, the accumulated numerical value is a large negative number and further reduction thereof is prevented by inhibiting the subtraction function such that the accumulator does not overflow on the negative side. With the subtraction function inhibited, A is passed through directly to the Y output, whereby A=Y. In the fifth combination 100, ALU 88 performs the function A+B and delivers the result as Y back to the accumulator. In the sixth and seventh combinations 111 and 110, there is an accumulated negative numerical value, and addition is permitted. In the eighth combination 101, the accumulated numerical value is a large positive number and further increase thereof is prevented by inhibiting the addition functions such that the accumulator will not overflow on the positive side. The A input is passed directly to the output as Y such that A=Y.

The accumulator width, number of bits per word, is a function of dynamic range. The shift function in register 122 used to determine the decay coefficient is not a function of the accumulator width, but a function of the time constant and clock rate. A shift of five bits yields a time constant of approximately 0.98 milliseconds at the 32 microsecond sample rate. The number of shift bits does set a minimum value the accumulator will decay to. For five bits, this value is 31. One of the effects of the accumulator width then is to establish a minimum to maximum value which can be accumulated. The higher the maximum numerical value the smaller the effect, percentage wise of full scale, the number 31 will have.

The outputs of the accumulators are delivered through a latch bus driver 126, FIG. 4, for buffering and isolation similarly to latch 82. The accumulated conferenced outputs on bus 36 are converted from LPCM to CVSD by generator 38, FIG. 1. This generator 38 operates in sequential order through the conference accumulator signal values and generates a bit stream of CVSD encoded time division multiplexed conference outputs. For a CVSD generator which handles 32 conferences, there would be one CVSD generator for each group of eight conferencers.

There is no inherent limit to the number of output conferences because the system flexibility enables increased capacity by merely adding additional conferencers and appropriate encoder modules 38 to carry the desired amount of traffic. Even with increased capacity, all of the CVSD conferenced outputs are still independent, and any input can still be placed in any one or all or any combination of the conference accumulators. The advantage of the disclosed architecture and the flexibility provided thereby is thus apparent in its ability to selectively combine inputs into more than one conference in an unlimited manner.

Another embodiment of the invention is shown in FIG. 8 wherein the conferencing system is generally designated by the reference character 200. In this system, CVSD voice signals from subscribing conferees are received from terminals in four groups of eight input channels each, thus accepting 32 conferee inputs 202. Considering the first group, the eight channels are delivered through an isolating buffer latch 204 to an eight to one multiplexer 206 which delivers the signals in time division multiplexed order over line 208 to DPCM generator 210. The remaining three groups likewise each deliver signals in time division multiplexed order over lines 212, 214 and 216 to the generator 210. Generator 210 converts the CVSD conferee signals to DPCM and delivers the converted signals in time division multiplexed order over bus 218. A conferencer module is provided for each of the groups, for example conferencer module 220 for the first group, and connected to bus 218.

Each conference module, such as module 220 for the first group, handles eight channels sequentially in time division multiplexed order and outputs the bit stream to a one to eight demultiplexer, such as demultiplexer 222 for the first group, which in turn delivers eight conferenced output channels. The output of conferencer module 220 is fed back via return line 224 to an input of generator 210. As noted in my prior U.S. patent application, Ser. No. 069,961, filed Aug. 27, 1979, entitled "System and Method for Generating a CVSD Conference Using Error Accumulation", this feedback scheme causes error accumulation in the conference accumulators which in closed loop operation effectively tends to null the numerical code value through repetitive self-correction, leaving the CVSD bit as the sign bit or its inversion. CVSD bits are thus delivered to demultiplexer 222 without a PCM to CVSD encoding compression as in module 38 of FIG. 1. The means for delivering CVSD outputs can thus comprise an encoder module such as 38, FIG. 1, or feedback means such as return line 224, FIG. 8. In FIG. 8, each of the remaining three conferencer modules employ the feedback type of CVSD bit generation, as shown by return lines 226, 228 and 230.

Figure 9:
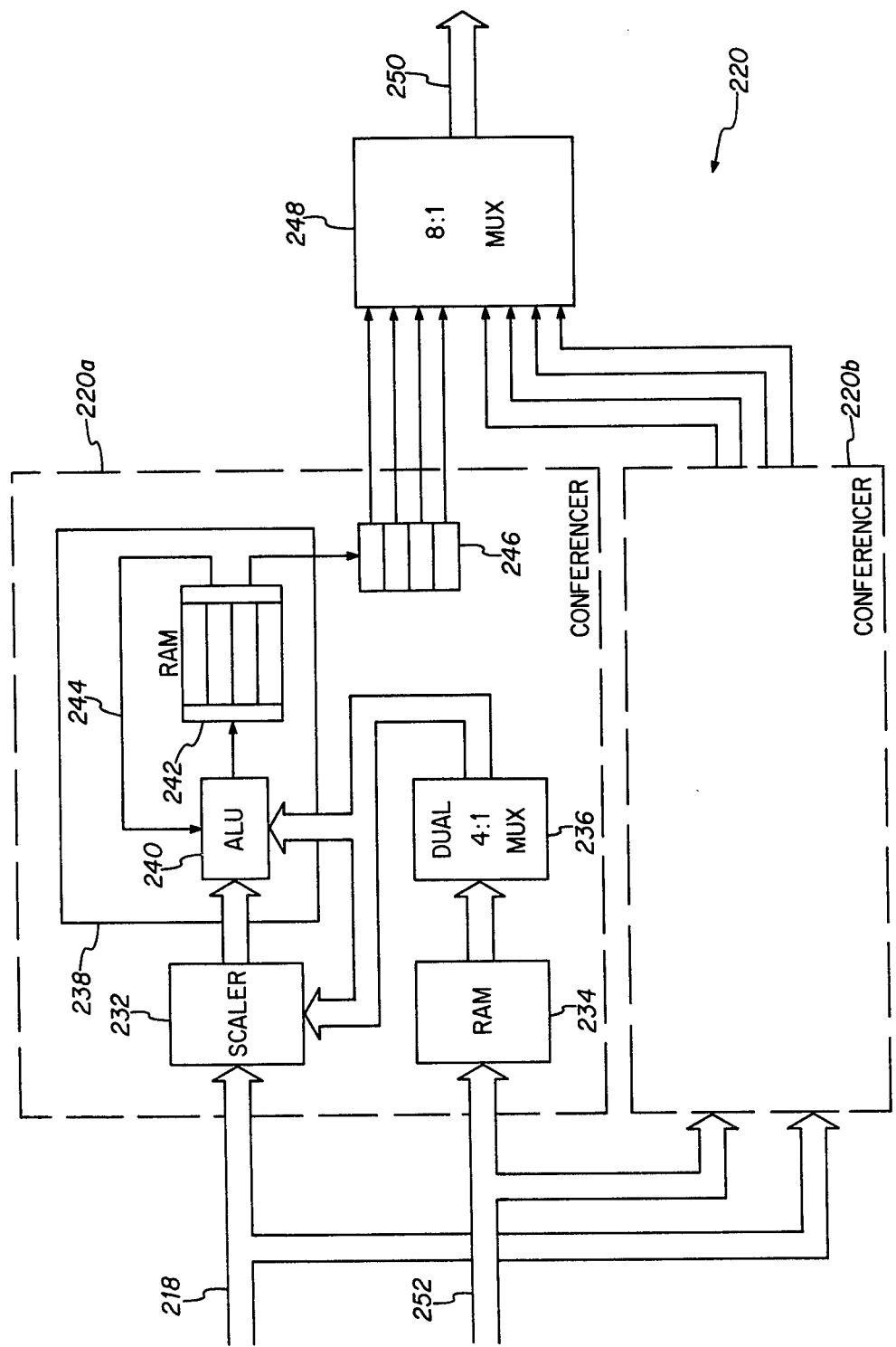
FIG. 9 is a schematic circuit diagram of the conferencing circuitry of FIG. 8.

Conferencer module 220 is further shown in FIG. 9, and comprises two identical conferencers 220a and 220b each of which outputs four conferences. In conferencer 220a, six bit DPCM data bus 218 is input to a scaler 232. A memory 234 contains control words each of which has sub-words multiplexed by multiplexer 236 for controlling the shifting function of scaler 232 and for controlling the function to be performed by a combined ALU and memory module 238, such as a 9405A chip. This module includes an ALU 240 with a built-in internal RAM memory 242 and an internal return 244 performing the functions described above in FIG. 4 for ALU 90, accumulators 30 and return 96, respectively. The accumulator RAM memory 244 has four locations and is accessed sequentially, and the four accumulated conferenced outputs are fed sequentially to a serial input, parallel output, shift register 246. The four parallel outputs of shift register 246 are the four conferences output by conferencer 220a and are fed together with the four conferences from identical conferencer 220b to an eight to one multiplexer 248 for delivery in time division multiplexed order over line 250. Memory 234 is loaded by bus 252 through generator 210, FIG. 8, and a control connection 254 from a loader 256 such as a microprocessor or the like.

As an exemplary implementation, ALU and memory module 238, FIG. 9, may be a set of 9405A chips of Fairchild Semiconductor. Structural details of a 9405 Arithmetic Logic Register Stack, equivalent to the 9405A as an illustrative component, are published beginning at page 6–26 of the book *Fairchild Semiconductor Low Power Schottky and Micrologic TTL*, 1975. These are four bit chips and hence three of such chips are used to provide the twelve bit width described above. The speed of summation may be increased if desired by additionally including look ahead and carry chips such as 54S182 and any appropriate buffering chips such as 54S244. The five bit numerical value code portion of the signal from bus 218 is delivered through scaler 232 such as a 25S10 of Advanced Micro Devices, Inc. The latter circuit is a four-bit shifter with three-state outputs, described structurally beginning at page 3–19 in the publication *Advanced Micro Devices Data Book*, 1974. A latch, such as latch 82 in FIG. 4, may be placed before or after scaler 232, FIG. 9, and may be a 54LS151. The sixth bit from bus 218, which is the original CVSD bit, may be delivered through a buffer such as a 54S240 and/or a latch such as a 54LS151. RAM memory 234 may be a 93419. The output of this memory may be delivered through a latch or register, such as register 100, FIG. 4, which may be a 54LS151 chip, to multiplexer 236 which may be a 54153 chip. The two bit output of the multiplexer 236, FIG. 9, and multiplexer 102, FIG. 4, may be delivered through an AND gate such as a 54LS11 chip and a latch such as a 54LS379 chip as a summation signal to the ALU to trigger summation therein when the two bit control code is other than 00. The ALU of FIGS. 4 and 9 may also be provided with a gate such as a 54SO2 chip which also receives the summation signal to gate the original CVSD bit as a sign bit to the ALU designating addition or subtraction. The output of module 238 is delivered to shift register 246 such as a 54LS379 chip whose output is delivered through a latch such as a 54LS151 chip to multiplexer 248 such as another 54LS151 chip implemented in the multiplexing mode.

One particularly desirable advantage of the flexibility and multiple independent conferences afforded by the invention is that each conferee in the same conference call can receive different composite signals of the conference. For example, conferees A, B and C may be involved in a conference call, and conferee C may also wish to monitor certain radio channels D and E. In this situation, a first accumulator sums the inputs from A, B and C, and outputs such composite to conferees A and B. A second accumulator sums the inputs from A, B, C, D and E, and outputs such composite to conferee C. In some instances, it is desirable to remove the conferee's own inputs from the composite signal being sent to him. In this case, a first accumulator would sum the inputs from B and C, and the output of this first accumulator would be sent to conferee A. A second accumulator would sum the inputs from A and C, and the composite output thereof would be sent to conferee B. A third accumulator would sum the inputs from A, B, D and E and the composite output thereof would be sent to conferee C. The multiple independent conference outputs may each be dedicated to be routed as an input to one particular conferee, or numerous tap-offs from the same accumulator output may be routed to various conferees. The arrangement of multiple independent CVSD conference outputs is thus particularly advantageous in its versatility and flexibility.

The aforenoted scaling of inputs afforded by scaler 86, FIG. 4, and scaler 232, FIG. 9, enable different volume levels for different conferees in a conference call. In one particularly desirable use, one of the conferees may be a radio operator who wishes to also monitor one or more radio channels at a reduced volume level as background. In this situation, the other conferees' inputs are multiplied to the six Db or twelve Db level and the radio channel input is left at the zero Db level in the composite signal sent to the radio operator.

It is recognized that various modifications are possible within the scope of the appended claims.

I claim:

1. A CVSD multiple conference system comprising: a plurality of conferencers each having a plurality of accumulators each for outputting a CVSD conference, and including means in each conferencer for selectively placing any one or all or any combination of a plurality of linear format inputs representing the size or weight of CVSD signals in any one or all or any combination of the accumulators in its respective conferencer independently of the accumulators in the remaining conferencers, and means for deriving from at least a designated one of said accumulators an output so that when the designated accumulator is selected to contain a combination of a plurality of said inputs, said output represents a conference of said CVSD signals.

2. The invention according to claim 1 wherein each said conferencer comprises:

arithmetic logic unit means for performing functions on said inputs and on the contents of said accumulators, including the functions of (a) summing an input with the contents of an accumulator and (b) leaving said contents unaltered; and memory means for storing the functions to be performed on each of said inputs by said arithmetic logic unit means for each of said accumulators.

3. The invention according to claim 2 wherein each of said CVSD signals is comprised of a CVSD bit and each said conferencer comprises:

means responsive to said CVSD bits as sign bits for choosing said summing to be additive or subtractive.

4. The invention according to claim 3 wherein said last mentioned means comprises means transmitting said CVSD bits as sign bits to said arithmetic logic unit means for choosing addition or subtraction when said memory means chooses said summing function.

5. The invention according to claim 2 wherein each said conferencer further comprises scaler means for performing functions on said inputs before application of the inputs to said arithmetic logic unit means, including the functions of (a) scaling the magnitude of an input and, (b) leaving said magnitude unaltered, and wherein said memory means also stores the functions to be performed on each of said inputs by said scaler means for each of said accumulators.

6. The invention according to claim 2 wherein said inputs are cyclicly sampled in sequential time division multiplex order, thereby providing a repeated sampling cycle having plural multiplex time slots, and wherein:

each conferencer includes means responsive to CVSD bits, each corresponding to one of said CVSD signals, as sign bits for choosing said summing to be additive or subtractive;

said memory means comprises at least one storage location for each of said plurality of inputs and is clocked from location to location at rate R1 in synchronism with the multiplexed time slots of said inputs, each storage location having a multibit word containing M sub-words;

each conferencer includes means connected to the output of its memory means for receiving said multibit words from said storage locations at rate R1, and multiplexing said M sub-words from said R1 rate to a faster rate R2; and each conferencer includes means for sequencing its set of accumulators at said rate R2 such that during each multiplex time slot of a CVSD signal each accumulator in a conferencer is accessed for a given sub-time slot, such that during the first sub-time slot of a given multiplex time slot an input is available to the first accumulator in each of said conferencers, and during the second sub-time slot of the same said given multiplex time slot the same said input is available to the second accumulator in each of said conferencers, and so on, each conferencer having at least M accumulators where M equals the ratio of R2 to R1, such that said M memory sub-words provide control codes for said arithmetic logic unit means for M conferenced accumulations in its conferencer during each multiplex time slot of a CVSD signal.

7. The invention according to claim 6 comprising a pair of buses each connected to all of said conferencers, one bus for carrying said inputs and the other bus for loading the memory means in said conferencers, and wherein each conferencer comprises:

an address register for receiving from said other bus the address to be written into in said memory means;

a data register for receiving from said other bus the data to be written into said address in said memory means;

a comparator for comparing the address in said address register against the currently sequenced input time slot on said one bus for outputting a coincidence signal; and a selector having a first state leaving each storage location in said memory means unaltered during sequencing thereof, and having a second state responsive to said coincidence signal from said comparator for gating the data from said data register into the memory location addressed by said address register.

8. The invention according to claim 1 wherein each said conferencer comprises:

scaler means for performing functions on said inputs including the functions of (a) scaling the magnitude of an input and (b) leaving said magnitude unaltered;

arithmetic logic unit means for performing functions on the inputs from said scaler means and on the contents of said accumulators, including the functions of (a) summing an input with the contents of an accumulator and, (b) leaving said contents unaltered;

memory means for storing the functions to be performed on each of said inputs by said scaler means and said arithmetic logic unit means for each of said accumulators;

means responsive to CVSD bits, each corresponding to one of said CVSD signals, as sign bits for choosing said summing to be additive or subtractive; and overload prevention means for preventing overflow of said accumulators beyond their capacity.

9. The invention according to claim 8 comprising means transmitting said CVSD bits as sign bits to said arithmetic logic unit means for choosing addition or subtraction when said memory means chooses said summing function, and wherein said overload prevention means comprises means for feeding back to said arithmetic logic unit means one or more of the most significant digits of the contents of said accumulators in combination with said CVSD sign bit for preventing addition or subtraction beyond the capacity of said accumulators.

10. The invention according to claim 8 wherein said inputs are cyclicly sampled in sequential time division multiplexed order, thereby providing a repeated sampling cycle having plural multiplex time slots, and wherein each said conferencer further comprises:

decay means incrementally reducing the contents of said accumulators during each sampling cycle to reduce the contents of an accumulator to a given value after a plurality of cycles with no conference activity therein.

11. The invention according to claim 10 wherein said decay means comprises:

a shift register in a feedback loop from the outputs of said accumulators for transmitting a decremented fractional value of the contents thereof to said arithmetic logic unit means during one of the multiplex time slots during each sampling cycle for subtraction from said contents.

12. The CVSD multiple conference system comprising:

means for generating a plurality of linear digital data signals from a respective plurality of CVSD inputs;

data bus means connected to the output of said generating means for receiving said signals;

conferencing means connected to said bus means and including a plurality of accumulators each for outputting a conference of a multiplicity of said CVSD inputs and including means for selectively placing any said signal in any one or all or any combination of said accumulators; and means connected to the outputs of said accumulators for delivering CVSD outputs.

13. The invention according to claim 12 wherein said conferencing means comprises:

arithmetic logic unit means for performing functions on said signals and on the contents of said accumulators, including the functions of (a) summing a signal with the contents of an accumulator and (b) leaving the latter unaltered; and memory means for storing the function to be performed on each of said signals by said arithmetic logic unit means for each of said accumulators.

14. The invention according to claim 13 wherein said conferencing means further comprises means responsive to input CVSD bits, each corresponding to one of said CVSD inputs, as sign bits for choosing said summing to be additive or subtractive.

15. The invention according to claim 13 wherein:

said generating means also outputs CVSD input bits, each corresponding to one of said CVSD inputs, to said bus means; and said conferencing means receives said CVSD bits and includes means transmitting said CVSD bits as a sign bits to said arithmetic logic unit means for choosing addition or subtraction when said memory means chooses said summing function.

16. The invention according to claim 15 wherein:

said generating means outputs a multiple bit digital signal code to said bus means for each CVSD input bit, said code having a first signal value portion containing a plurality of bits representing the size or weight of the CVSD bit, said code having a second portion containing the CVSD bit; and said conferencing means comprises first transmission means delivering said first signal value portion of said code to a first input to said arithmetic logic unit means to be summed with accumulator contents when designated by said memory means, and comprises second transmission means delivering said CVSD bit portion of said code as a second input to said arithmetic logic unit means for choosing additive or subtractive summing in the latter according to the sign polarity of said CVSD bit.

17. The invention according to claim 13 wherein:

said generating means outputs said signals in sequential time division multiplexed order on said bus means at a rate R1; and said plurality of accumulators comprises register means having a capacity of at least M words, one conference per word, and is clocked from word to word at a rate R2 which is greater than R1, and wherein M equals the ratio of R2 to R1.

18. The invention according to claim 17 wherein:

said memory means includes at least one storage location for each of said plurality of CVSD inputs and is clocked from location to location at rate R1 in synchronism with the appearance of the respective said signal on said bus means, each storage location having a multibit word containing M sub-words; and said conferencing means includes means connected to the output of said memory means for receiving said multibit words from said storage locations at rate R1, and multiplexing said M sub-words from said R1 rate to said R2 rate in synchronism with said R2 rate clocking of said register means, such that each said M memory sub-words provide control codes for said arithmetic logic unit means for M conferenced accumulations for each CVSD input.

19. The invention according to claim 13 wherein said conferencing means comprises a plurality of conferencers connected to said bus means, each conferencer having its own set of said accumulators, its own said arithmetic logic unit means and its own said memory means, each conferencer generating a plurality of conferenced outputs.

20. The invention according to claim 19 wherein:
said generating means outputs said signals in sequential time division multiplexed order on said bus means at rate R1 such that each said signal is available on said bus means during a given time slot; and
said conferencers are connected in parallel to said bus means and each conferencer sequences its own set of accumulators at a rate R2 faster than R1 such that during each said time slot each accumulator in a conferencer is accessed for a given sub-time slot, such that during the first sub-time slot of a given time slot of said bus means a signal is available to the first accumulator in each of said conferencers, and during the second sub-time slot of the same said given time slot of said bus means the same said linear signal is available to the second accumulator in each of said conferencers and so on, each conferencer having at least as many accumulators as the number of sub-time slots in one time slot of said bus means.

21. The invention according to claim 20 wherein:
said generating means outputs a multiple bit digital signal code to said bus means for each of CVSD input bits corresponding to said CVSD inputs, said code having a first numerical value portion containing a plurality of bits representing the size or weight of the CVSD bit, said code having a second portion containing the CVSD bit;
each said conferencer comprises first transmission means delivering said first numerical value portion of said code to a first input to its arithmetic logic unit means to be summed with accumulator contents when designated by its memory means, and comprises second transmission means delivering said CVSD bit portion of said code as a sign bit to a second input to its arithmetic logic unit means for choosing additive or subtractive summing in the latter according to the sign polarity of the CVSD bit;

the memory means of each conferencer includes at least one storage location for each of said plurality of CVSD inputs and is clocked from location to location at rate R1 in synchronism with the appearance of the respective said multiple bit signal on said bus means, each storage location having a multibit word containing M sub-words; and each conferencer includes means connected to the output of its memory means for receiving said multibit words from said storage locations at rate R1, and multiplexing said M sub-words from said R1 rate to said R2 rate in synchronism with said R2 rate clocking of its accumulators, such that said M memory sub-words provide control codes for said arithmetic logic unit means for M conferenced accumulations by each conferencer during each said CVSD input.

22. A CVSD multiple conference system comprising:
a plurality of parallel conferencers;
a data bus connected to all of said conferencers for making available to said conferencers a plurality of sequential time division multiplexed input signals, each signal comprising a multilevel digital linear code representing the size or weight of an input CVSD bit;
each conferencer comprising:
a plurality of accumulators for outputting a conference of a multiplicity of CVSD signals, each corresponding to one of said input CVSD bits;
means sequentially accessing each of the accumulators in that conferencer in time division multiplex order for a sub-time slot of each input signal time slot on said bus, and for each sub-time slot either leaving the contents of the sequenced accumulator unaltered or additively or subtractively summing said multilevel digital linear code with said contents according to the polarity of said CVSD bit; and
a memory having a plurality of storage locations providing control codes for each summation in each accumulator in its conferencer during each of said input signal time slots.

23. The invention according to claim 22 wherein each conferencer further comprises a scaler for altering the magnitude of said multilevel digital linear code from said bus in response to the control code from said memory for the current time slot of said bus and sub-time slot therein for the currently sequenced accumulator, for altering the volume level of the respective conferee's voice signal output from said accumulator.

* * * * *